(12) United States Patent
Dailey et al.

(10) Patent No.: US 6,688,110 B2
(45) Date of Patent: Feb. 10, 2004

(54) AIR IMPINGEMENT COOLING SYSTEM

(75) Inventors: Geoffrey M. Dailey, Derby (GB); Changmin Son, Oxford (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/301,691

(22) Filed: Nov. 22, 2002

(65) Prior Publication Data

US 2003/0140632 A1 Jul. 31, 2003

Related U.S. Application Data

(63) Continuation-in-part of application No. 09/748,861, filed on Dec. 28, 2000, now abandoned.

(30) Foreign Application Priority Data

Jan. 18, 2000 (GB) ............................................. 0000963

(51) Int. Cl.$^7$ ................................................. F02C 7/12
(52) U.S. Cl. ......................... 60/752; 165/133; 165/908; 415/178
(58) Field of Search .......................... 60/752, 754, 760; 165/133, 908; 415/115, 178, 914; 416/95, 96 A; 428/686

(56) References Cited

U.S. PATENT DOCUMENTS 5,586,866 A * 12/1996 Wettstein .................. 416/96 A
6,439,846 B1 * 8/2002 Anderson et al. ......... 416/96 A

FOREIGN PATENT DOCUMENTS

WO    WO 99/01643    *    1/1999

* cited by examiner

*Primary Examiner*—Louis J. Casaregola
(74) *Attorney, Agent, or Firm*—W. Warren Taltavull; Manelli Denison & Selter PLLC

(57) ABSTRACT

Where gas turbine engine structure eg combustion equipment, is to be air impingement cooled, the surface which receives the air jets is so shaped as to produce boundary layer separation zones 34, 38 and 44 in the cooling air, as it spreads across the surface. Mixing of the boundary layer with the remainder of the air flow results, followed by the re-establishment of the boundary layer. The new boundary layer is cooler than the original layer and so provides more effective cooling.

4 Claims, 2 Drawing Sheets

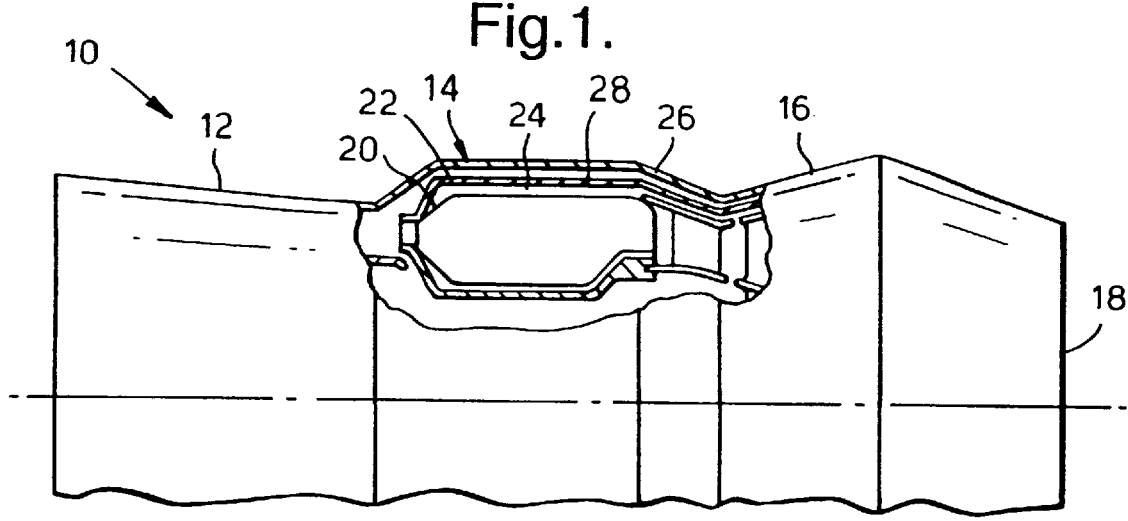
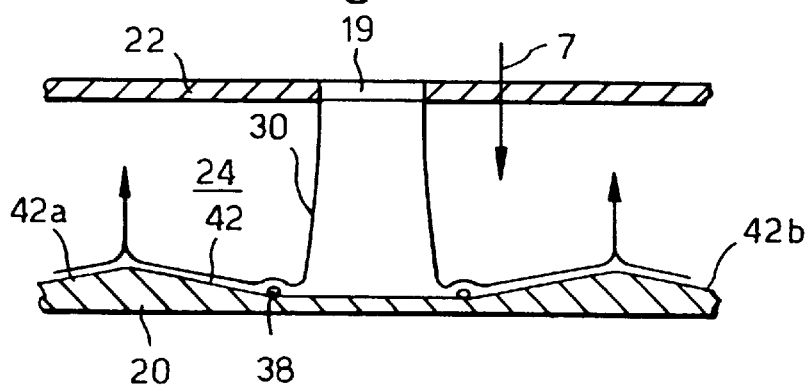
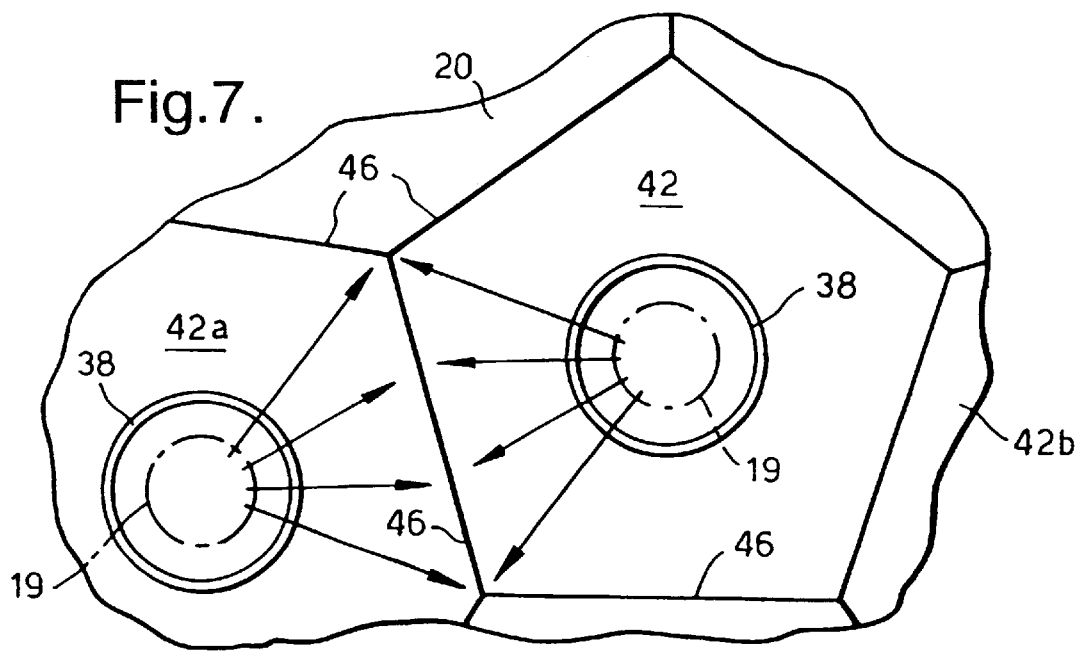

AIR IMPINGEMENT COOLING SYSTEM

This is a Continuation-in-Part of National Appln. No. 09/748,861 filed Dec. 28, 2000 abandoned.

FIELD OF THE INVENTION

The present invention relates to a system for cooling components which in use, experience high temperatures. The invention has particular efficacy in the gas turbine field, and may be incorporated in gas turbine engines of the kinds used to power aircraft or ships, or to pump oil overland.

BACKGROUND OF THE INVENTION

Air impingement cooling of gas turbine engine combustion equipment and other structures therein, is well known. However, known systems, wherein cooling air flowing over the surface of one member, passes through holes and crosses a gap, to impinge on a surface of an adjacent hot member, fail to achieve their full cooling potential. This is because the jet of air, on striking the surface of the hot member, spreads over the surface, effectively in a layer of constant thickness. It follows, that the outer portion of the layer never touches the hot member, and consequently, cannot make an efficient contribution to the cooling effect of the air flow.

A further drawback to known impingement cooling systems, is that, having impinged on the hot surface, and spread through 360° over the hot surface, the respective air flows collide with each other, and form a turbulent mix with poor heat transfer performance, and which sometimes displaces incoming air jets. Hot spots are thus formed.

SUMMARY OF THE INVENTION

The present invention seeks to provide an improved air impingement cooling system.

According to the present invention, an air impingement cooling system comprises superimposed, spaced apart members, one perforated, the other having a surface portion directly under each respective perforation, each said surface portion being of fluctuating shape, so as to cause air received thereby via respective perforations, and deflected laterally there across, to flow over said fluctuations, said fluctuating shape being such that the boundary layer of said air flow over said surface portion is caused to separate from said surface portion in the region of said fluctuations and subsequently reform downstream of said separation.

BRIEF DESCRIPTION OF THE DRAWINGS

The invention will now be described, by way of example, and with reference to the accompanying drawings in which:

FIG. 1 is a diagrammatic view of a gas turbine engine having combustion equipment which incorporates the present invention.

FIGS. 2 to 6 are examples of alternative configurations of the present invention.

FIG. 7 is a view in the direction of arrow 7 in FIG. 6.

DETAILED DESCRIPTION OF THE INVENTION

Figure 2:
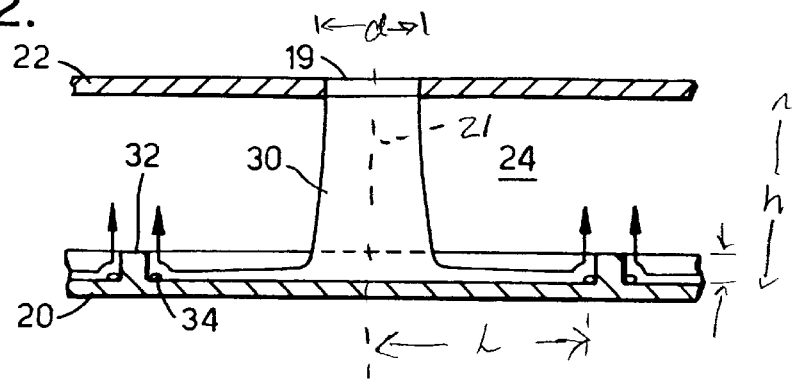

Referring to FIG. 1. A gas turbine engine 10 has a compressor 12, combustion equipment 14, a turbine section 16, and an exhaust nozzle 18, all arranged in flow series in known manner. The operation of the gas turbine engine 10 is well known and will not therefore be described herein.

The combustion equipment comprises flame tubes 20, surrounded by a casing 22, which is spaced therefrom. The space is numbered 24. Casing 22 is itself spaced from an outer engine casing 26, that space being numbered 28.

Space 28 is connected to receive a flow of air from compressor 12, which air flows over the outer surface of casing 22, some air thus by-passing the flame tubes 20, the remainder passing through a large number of holes 19 in casing 20 (FIGS. 2–6) to impinge on the outer surface of respective flame tubes 20, so as to cool them. The air is in the form of individual jets, numbered 30. (FIGS. 2–6).

Referring to FIG. 2, in this example, when an air jet 30 strikes the outer surface portion of flame tube 20 which is directly under it, the air spreads laterally of the jet, over 360° across that surface portion, until it meets a barrier defined by wall 32, which totally bounds the surface portion struck by and expanded over by the air jet, up to the limit where, without the presence of the wall 32, the spreading flow would collide with those flows spreading from immediately adjacent jets. Thus, the wall 32 completely surrounds the surface portion as is the case in the FIGS. 3, 4 and 5 examples. Additionally, each surface portion bounded by a wall 32 is impinged by an air jet 30 from a single hole 19 the axis 21 of which intercepts the surface portion substantially at the center of each surface portion. Also, as shown in FIG. 2, the following dimensional relationships may be employed where d is the diameter of the hole 19 and h is distance from the casing 22 to the surface portion 34 bounded by the wall 32 which may slope at an angle α from the surface portion and the distance from the point of interception of the axis 21 of the hole 19 to the boundary wall 32 is L: L≧d; α≧30°; the height of the wall 32 should be ≦0.3h.

On striking the wall 32, the boundary layer of the cooling air flow, that is, the portion of the flow immediately adjacent the surface portion, separates from the surface portion in the region 34. This causes mixing of the boundary layer and the remainder of the cooling air flow, before the boundary layer reforms and attaches itself to the wall. However the reformed boundary layer is cooler than the previous boundary layer due to this mixing and so provides more effective cooling of the wall 32.

On perusal of FIGS. 2 to 5, it will be clear to the expert in the field, that the wall 32 also provides parts of boundaries for those jets immediately surrounding the jet 30, an example being depicted in FIG. 7, to which reference is made later in this specification.

Figure 3:
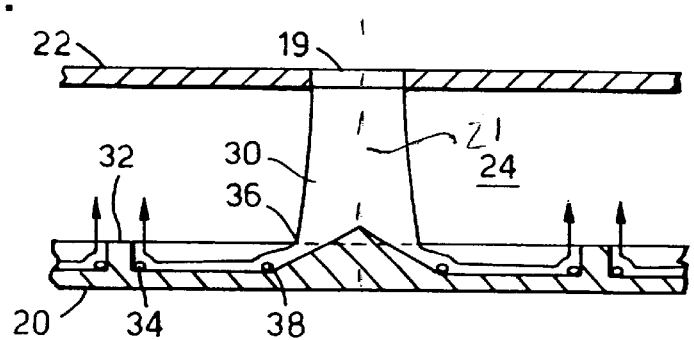

Referring to FIG. 3. in which like parts have like numbers. In this example, the centre of the portion bounded by wall 32 is provided with a cone 36, the apex of which faces into the jet 30. Such a shape defines a fluctuation in surface shape at its junction with the flame tube 20 outer surface. This fluctuation causes separation of the boundary layer flow in the region 38. The separated boundary layer, which at this position is hotter than the remainder of the cooling air flow, mixes with, and is thereby cooled, by the remainder of the cooling air flow. A new, cooler and thinner boundary layer then forms which proceeds to flow towards the wall 32, in turn providing more effective cooling of the outer surface of the flame tube 20.

Figure 4:
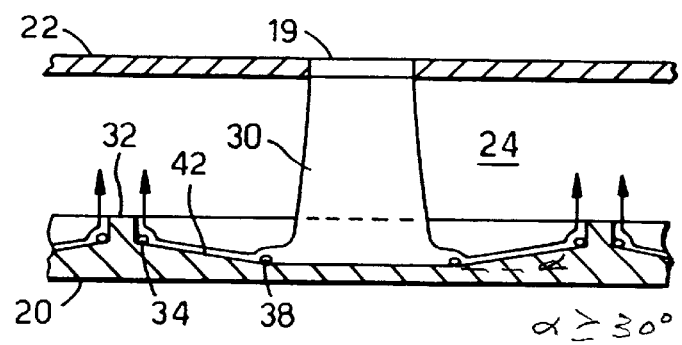

Referring to FIG. 4. In this example, separation of the boundary layer of the cooling air flow is provided in the region 38 by the provision of a rising slope 42 in the surface portion. The separated boundary layer then mixes, and is therefore cooled, by the remainder of the cooling air flow before a new, cooler, boundary layer is formed which flows towards the wall 32.

Figure 5:
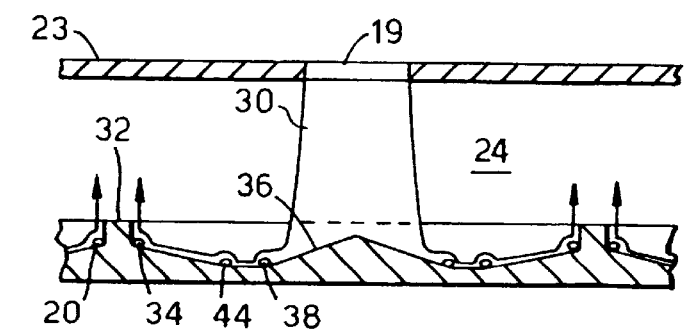

Referring to FIG. 5. This example combines the cone 36 of FIG. 3 with the rising slope 42 of FIG. 4, and produces, in the one arrangement, boundary layer separation which occurs in the regions 34, 38 and 44, thereby providing more efficient cooling.

Referring to FIG. 6. This example utilises the rising slope 42 of FIG. 4, but not the boundary wall 32 thereof. Instead, the rising slope 42 of FIG. 6 meets rising slopes eg 42a and 42b of adjacent surface portions, which features are more clearly seen in FIG. 7. The advantages accrued by the arrangement depicted in FIG. 6 are reduction in weight, and at least a reduction in turbulence, when opposing, spreading air flows meet, by virtue of the flows already having a small directional component, which will serve to generate a resultant direction of flow of the collided air flows, in parallel with the jets.

Referring now to FIG. 7. When opposing, spreading air flows collide, they tend to form a barrier which approximates a straight line. Thus, ridges 46 represent that line, one such ridge 46 lying between the heads of respective groups of arrows 48 and 50, which in turn, represent colliding air flows. From this, it will be appreciated that each impingement surface is bounded by a plurality of straight lines which, in the present example, define a pentagon.

However, in practice of the present invention, the actual number of straight lines and therefore, the shape defined, will be dependant on the number of perforations 19 in casing 20 (not shown in FIG. 7) and the pattern in which they are drilled.

Boundaries of circular shape (not shown) may be provided, but the resulting interstices of solid metal would add weight. If they were to be machined out, cut-outs would have to be made in the boundary edges, so as to allow spreading cooling air to flow into the resulting pockets.

The cone 36 in both FIG. 3 and FIG. 5 may be of circular form in cross section. Alternatively, it could be multi-faceted e.g. pyramid-like.

We claim:

1. An air impingement cooling system comprising first and second members in superimposed, spaced apart relationship, said second member having a surface, said first member having a plurality of holes therein to direct cooling air therethrough to impinge upon portions of the surface of said second member and subsequently flow laterally across each said respective surface portion, each hole being positioned to direct cooling air onto a said portion of said surface, said portions of said second member each being entirely bounded by a surrounding wall configured to intercept said lateral air flow and cause the separation of the boundary layer of said air flow across said respective surface portion of said surface of said second member at the juncture of said wall and said respective portion of said surfaces each said hole having a central axis which axis intercepts said respective portion substantially at the center of said respective portion.

2. An air impingement cooling system as claimed in claim 1 wherein said second member includes junctures of said respective walls and surface portions which define fluctuations in said surface portions.

3. An air impingement cooling system as claimed in claim 1, wherein said superimposed, spaced apart members comprise a gas turbine engine flame tube and a casing which surrounds said flame tube, and includes a plurality of perforations therein.

4. An air impingement cooling system as claimed in claim 2 including a sloping portion rising from each said surface portion and wherein said fluctuations comprise the juncture of said sloping portion with a respective surface portion.

* * * * *